(No Model.)
J. F. KILLIAN.
VEHICLE JACK.
No. 597,167. Patented Jan. 11, 1898.
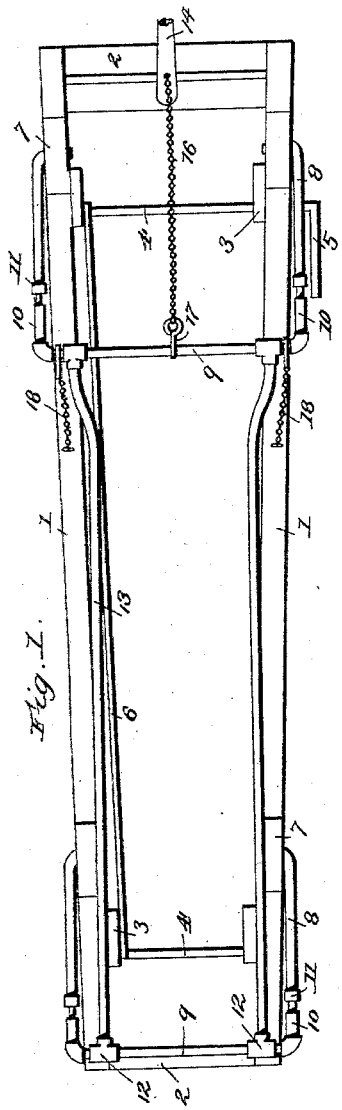
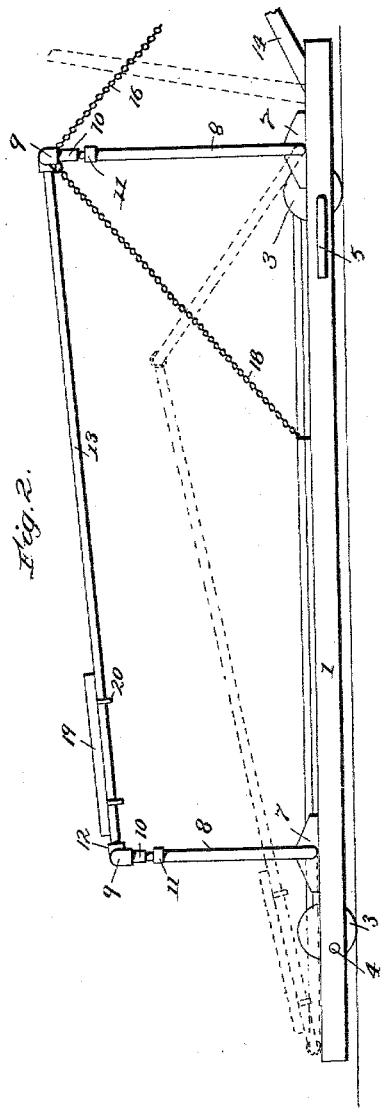
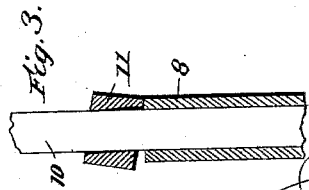

UNITED STATES PATENT OFFICE.

JOHN F. KILLIAN, OF STOCKTON, CALIFORNIA.

VEHICLE-JACK.

SPECIFICATION forming part of Letters Patent No. 597,167, dated January 11, 1898.

Application filed March 31, 1897. Serial No. 630,195. (No model.)

*To all whom it may concern:*

Be it known that I, JOHN F. KILLIAN, a citizen of the United States, residing at Stockton, in the county of San Joaquin and State of California, have invented certain new and useful Improvements in Vehicle-Jacks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to certain new and useful improvements in vehicle-jacks, such as are used for raising the running-gear of vehicles, so as to allow the free revolution of the wheels while the same are being operated upon.

The object of my invention is to provide a vehicle-jack which will raise the whole vehicle from the ground and dispense with the necessity attendant on those now in use of changing from wheel to wheel; and it consists in the peculiar construction, novel combination, and adaptation of parts hereinafter described, and particularly pointed out in the claims hereunto annexed.

Referring to the accompanying drawings, Figure 1 is a plan view of my improved vehicle-jack. Fig. 2 is a side elevation of the same. Fig. 3 is a detached sectional elevation of one of the standards, showing the extensible feature of the same.

Similar figures of reference indicate corresponding parts in the several views.

Number 1 represents the longitudinal frame-beams, which are maintained in position by means of cross-beams 2, rigidly attached at either end. The frame is mounted on eccentrical rollers 3, which are journaled on the inside of the beams 1, and the axes 4 of the same are off center for the purpose of raising the entire jack for the accommodation of high vehicles, which is effected by a crank 5, attached to one of the journals of the axes 4, and the front and rear sets of rollers 3 are joined by a pitman 6, which is pivotally attached to such rollers and communicates motion thereto.

A telescopic lifting-jack is journaled near either end of the frame in journal-bearings 7, and such jacks are composed of hollow stems 8, which have their lower ends angled and inserted in such journal-bearings 7. A cross truss-rod having appendant rods 10, which are inserted in the stems 8, engages such stems 8. The appendant rods 10 are surrounded by pinch or slip nuts 11, which are adapted to engage with the top ends of the stems 8, as and for the purpose hereinafter shown.

The stems 8 of the rear lifting-jack are higher than the front jack, corresponding with the relative height of the axles of vehicles.

The truss-rods 9, near the junction of the appendant rods 10 with the same, are provided with T-joints 12, which are pivotally attached thereto, and such T-joints 12 are rigidly attached to the ends of longitudinal truss-rods 13, which are of a length corresponding to the distance between the journal-bearings 7.

While not in use the trusses are in the position shown by the dotted lines, Fig. 2, and when it is desired to raise a vehicle a lever 14 is inserted in the center of a roller 15, which is journaled at and in the rear end of the frame, and such lever 14 is provided with a chain or cord 16, suitably attached thereto, which chain 16 is provided with a hook 17 on the loose end, which hook 17 is engaged with the rear truss 9, and the lever 14 is then pressed rearwardly, which raises the trusses 9 and 13, and the same are tilted past the center of gravity and are prevented from tilting completely over by means of check-chains 18, which are attached at one end to the frame and at the other end to the stems 8. The pinch-nut 11 has the opening therein angular with relation to the exterior sides, so that one edge will engage with the top end of the stem 8, whereupon such nut 11 will be pressed against the sides of the rod 10 and prevent the same from extending farther into the stem 8.

19 represents a board, which is attached to the trusses 13 by means of staples 20, which are adapted to receive such truss-rods 13 loosely for the purpose of allowing the board to slide longitudinally on such rods 13.

The mode of operating my improved vehicle-jack is as follows: The apparatus is first placed where it is desired to have the vehicle raised, and the vehicle is then placed over the vehicle-jack, which is in a knocked-down position while not in use, and the lever 14 is placed in the roller 15, and the chain 16 and hook 17 are placed in position. Then the operator presses rearwardly on the lever 14, whereupon the trusses 13 will engage with the axles of the vehicle and raise the wheels from off the floor, the same being held in raised position by the chains 18. The board 19 is adapted to engage with the king-bolt of the vehicle, thereby enabling the gyratory motion of the front axle. When it is desired to lower the vehicle, the trusses are pressed forward, whereupon the weight of the vehicle and the trusses causes the same to drop to the position as shown by dotted lines, Fig. 2. The trusses 9 are pressed outwardly, thus withdrawing the rods 10 a suitable distance from the stems 8, whereupon the pinch-nuts 11 prevent the rods 10 from reëntering such stems 8. Should it be desired to lower the trusses, the operator grasps the pinch-nuts 11, and by relieving the same of the weight such nuts 11 may be easily slipped to any point on the rods 10, and as the weight is deposited on the trusses the nuts 11 become rigid. The operation is repeated at each time.

Having thus described my invention, what I claim as new, and desire to secure by Letters Patent, is—

1. In a vehicle-jack of the class described the combination with the frame or sills of extensible trusses pivotally journaled laterally on such frame, the connecting longitudinal truss-rods attached to the lateral trusses, suitable means for raising and lowering the same and suitable means for maintaining the same in elevated position, all substantially as shown and described.

2. In a vehicle-jack of the class described the combination with a suitable frame of trusses pivotally journaled at suitable intervals on such frame, the longitudinal truss-rods attached to such trusses and adapted to engage with the axles of the vehicle, the board 19 adjustably attached near the front end of such longitudinal truss-rods, the chains 18 attached to the frame and to the rear truss, the roller 15 journaled on the rear of the frame, the lever 14 adapted to engage with such roller, the chain 16 suitably attached to such lever 14 and adapted to engage with the rear truss, the rollers 3 eccentrically journaled in the frame at or near either end of the same, the pitman 6 connecting such eccentric rollers and the crank 5 suitably attached to one of the journals of the rollers 3 all arranged and operating substantially as shown and for the purposes specified.

3. In a vehicle-jack of the class described, the combination with the frame of the telescopic trusses having the stems 8, the rods 10 and the pinch-nuts 11, such trusses being journaled near either end of such frame, the longitudinal truss-rods 13 suitably attached to the telescopic trusses, the board 19 adjustably attached to the truss-rods 13, the stay-chains 18 attached to the frame and to the rear telescopic truss, the rollers 3 eccentrically journaled in the frame, the pitman 6 connecting such rollers 3, the crank or lever 5 suitably attached to one set of the rollers 3, and suitable means for raising the trusses, all arranged and operating substantially as shown and for the purposes specified.

In testimony whereof I affix my signature in presence of two witnesses.

JOHN F. KILLIAN.

Witnesses:
MOLBRY HAYNES,
JAMES T. SUMMERVILLE.